April 9, 1957 C. E. DE PUY ET AL 2,788,492

MODULATION CONTROL CIRCUIT

Filed June 12, 1953 2 Sheets-Sheet 1

INVENTORS.
CLARENCE E. DePUY
SIDNEY S. KONIGSBERG

BY

Lippincott & Smith.

ATTORNEYS

MODULATION CONTROL CIRCUIT

Filed June 12, 1953

INVENTORS.
CLARENCE E. DePUY
SIDNEY S. KONIGSBERG
BY
Lippincott & Smith.
ATTORNEYS

United States Patent Office 2,788,492

Patented Apr. 9, 1957

2,788,492

MODULATION CONTROL CIRCUIT

Clarence E. De Puy, Mill Valley, and Sidney S. Konigsberg, San Francisco, Calif., assignors to Electronic Equipment Corporation, San Francisco, Calif., a corporation of California

Application June 12, 1953, Serial No. 361,282

8 Claims. (Cl. 332—38)

The present invention relates in general to modulation control effected in accordance with the amplitude of the modulating wave. Particularly, the invention is concerned with the prevention of what is known in the art as "splattering," introduced when the amplitude of the modulated wave is effectively reduced to zero. In the transmission of intelligence this condition obtains when the amplitude of the modulating wave or signal substractively equals or exceeds the carrier amplitude. Splattering causes interference with adjacent channels, being evidenced by sounds resembling key clicks and the like and is therefore highly undesirable.

The prior art has in general approached the problem by interposing a limiter stage in the signal path to confine the amplitude of the signal within limits such that under normal operating conditions the amplitude of the signal never exceeds that of the carrier and consequently the latter is present at all times. However, the effectiveness of such an arrangement is dependent upon normal operating conditions prevailing at all times, particularly as concerns the final modulated amplifier or stage in which the modulation process is accomplished. The use of the limiter stage not only introduces distortion but also fails to solve the problem whenever the load on the final modulated amplifier of the transmitter is decreased sufficiently to enable the amplitude of the limited signal to exceed the carrier amplitude. The carrier is thus cut off during the negative troughs of the signal wave to introduce the undesired splattering effect. In general it may be stated of such systems that whenever the load on the modulated final amplifier is decreased with the signal being maintained, then any limiting device positioned in the early stages of the signal path will prove ineffective to prevent splattering. This limitation of the prior art is indeed real in that aging of the transmitter tubes changes their characteristics sufficiently to permit the undesired effects above mentioned to prevail. Particularly, the use of limiting devices in general is unreliable if the transmitter is a marine installation because any change in the ship rigging may readily affect the antenna tuning and thereby reduce the load on the modulator or final amplifier. Other adverse factors also affecting the loading of the modulated final amplifier are battery voltage change, ship vibration and general effects occasioned by the elements such as dew, sunshine and moisture content in the atmosphere.

The present invention provides a sampling or sensing circuit responsive to the amplitude of the negative swing of the amplified modulating or signal wave as applied to the modulator or final modulated amplifier. The sensing circuit exercises control over the amplitude of the signal at some point along the signal path, preferably in the early or low power stages thereof, effective when the signal amplitude on the negative swing approaches the carrier amplitude. In this arrangement negative feedback principles obtain and the signal amplitude is reduced sufficiently to prevent complete cancellation or cutoff of the carrier. In this manner the present invention is effective at the point in the transmitter circuit directly responsible for the introduction of modulating amplitudes sufficiently great as to cut off the carrier, this being a sensing action and control being exercised at an eariler point in the signalling path where the power level is low. The voltage appearing across the sensing circuit is the amplified signal or modulating voltage superimposed upon the D. C. power supply voltage, the combination hereinafter referred to as the "high voltage modulated."

The sensing circuit includes a non-linear impedance used to supply normally a constant operating voltage to an amplifier stage effective to increase the power level of the signal wave. However, when the amplitude of the negative swing of the signal wave approaches that of the D. C. power source the non-linear impedance loses control of the normally supplied operating potential for the amplifier and negative feedback is introduced in accordance with the increasing amplitude of the negative swing of the signal to decrease the normal operating potential and hence the signal strength. In this manner the present invention, although not directly operative on the carrier or wave to be modulated, insures that some portion of the carrier is always present, i. e., is never cut off completely and consequently splattering and the undesired noise effects associated therewith are avoided.

The non-linear impedance included in the sensing circuit may comprise, for example, a gaseous discharge tube adapted to hold a substantially constant voltage therecross until the effective amplitude of the high voltage modulated decreases below the sustaining voltage for the gaseous tube. The tube is then rendered ineffective to control the operating potential applied to the amplifier and the control is automatically transferred to the high voltage modulated effective as negative feedback to the amplifier. Therefore, in effect, the signal or modulating wave degenerates itself if its amplitude measured on the negative swing approaches that of the carrier. Other devices capable of exhibiting similar characteristics may be employed in lieu of the gaseous type tube following the practice of the present invention.

Although by definition carrier cut-off effected at 100% modulation occurs when the negative swing of the signal equals the positive swing of the carrier, in actual practice such a condition obtains if the negative swing of the signal equals or exceeds the D. C. power supply voltage applied to the anode of the modulator tube. Cutoff of the modulator tube interrupts carrier supply to the antenna and the resulting transient output of the tank circuit occasions the adjacent channel interference hereinbefore mentioned. In the present invention the D. C. portion of the high voltage modulated normally appearing across the gaseous discharge tuge of the sensing circuit represents a fixed percentage of the anode or plate D. C. voltage applied to the modulator tube. The maximum negative swing of the signal voltage is substantially limited to the D. C. supply voltage minus the fixed percentage thereof because when the sustaining voltage for the gaseous discharge tube is reduced, negative feedback in accordance with the signal amplitude automatically decreases the signal swing in the output of the controlled amplifier stage. Therefore the D. C. voltage effective at the anode of the modulator tube is never reduced to zero to cut off the carrier completely.

The invention also contemplates a circuit operative in accordance with the aforementioned principles useable to adapt conventional transmitters to anti-splattering operation. It will be appreciated that in either the complete circuit or the adapter circuit the application of control of the operating potential may affect various electrodes of the amplifier device as is explained in detail hereinafter.

With the foregoing in mind, among the objects of the present invention are: the provision of an economical modulation control circuit independent of any splattering choke or tube; the provision of such a circuit automatically effective to prevent splattering; the provision of an adapter circuit capable of modifying existing transmitters to incorporate anti-splattering features; and the provision of a modulation control circuit effective to control the modulating wave at relatively low power level in contrast with its power level as utilized in the modulation process.

Other and further objects and features of the present invention will become apparent to those skilled in the art from the following detailed description thereof when viewed in the light of the accompanying drawings wherein.

Figure 1:
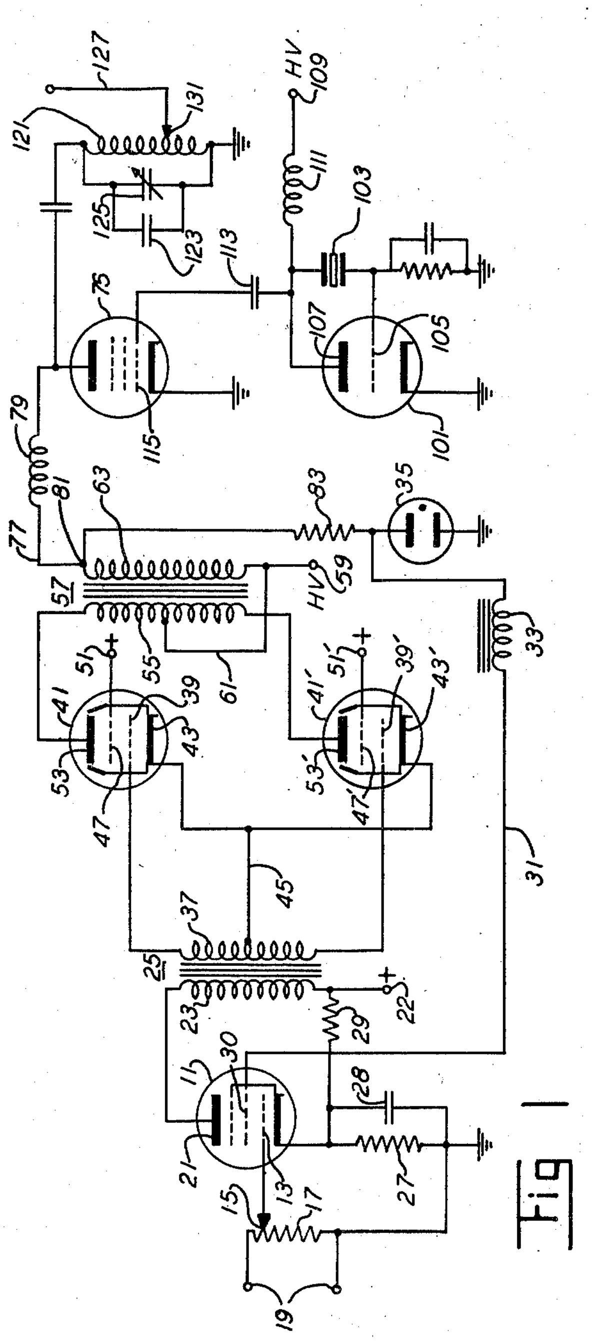
Fig. 1 is a circuit diagram of a portion of a transmitter having incorporated therein a modulation control circuit of the present invention.

The invention as illustrated in Fig. 1 is shown incorporated in a transmitter of conventional design employing high level modulation. The invention may be used to modify transmitters in general, the showing of Fig. 1 being merely exemplary to represent the operation of the invention and the ease of incorporation in transmitters of conventional character. The transmitter includes an audio or signal path incorporating a driver amplifier tube 11 having a control electrode 13 connected to a variable tap 15 of a gain control potentiometer 17, across which the audio signal appears as introduced at the input terminals 19. The anode of the amplifier tube 11 is supplied with positive potential at the terminal 22 through a primary winding 23 of an output transformer 25, the tube being biased by a cathode resistor 27 by-passed to ground by a condenser 28 in known manner. A high value bleeder resistor 29 is connected between the positive potential supply and the cathode resistor 27 in the manner of a voltage divider to insure the biasing action at all times. The screen grid 30 of the driver tube 11 is normally maintained positive relative to ground by the lead 31 connected through an audio choke coil 33 to one side of a non-linear impedance shown as the voltage regulator tube 35, the operation of which will be more fully discussed hereinafter.

The audio signal is transferred to a secondary winding 37 of the output transformer 25 connected to the control electrodes 39 and 39' respectively of a pair of beam power tubes 41 and 41' arranged for amplifier action, the cathodes 43 and 43' connecting to the center tap of the transformer winding 37 via conductor 45. The screen grids 47 and 47' of the power tubes 41 and 41' are maintained positive relative to ground by a regulated power supply as introduced at the terminals 51 and 51'. Direct voltage indicated by the symbol "HV" for high voltage is applied to the anodes 53 and 53' of the power tubes 41 and 41' through the primary winding 55 of an output transformer 57, the high voltage terminal 59 being center tapped into the primary winding 55 via lead 61. The secondary winding 63 of the output transformer 57 is connected between high voltage terminal 59 and the plate circuit of a modulator or modulated final amplifier tube 75 via lead 77 including R. F. choke coil 79. Accordingly, the junction point 81 between one end of the secondary 63 and lead 77 is varied in potential in accordance with the amplified audio signal as superimposed upon the D. C. voltage introduced at the high voltage terminal 59. The effective voltage appearing between point 81 and ground is the high voltage modulated, as defined above. The ungrounded side of the VR tube 35 is connected through a large dropping resistor 83 to the junction point 81.

The VR tube 35 will function to maintain substantially constant D. C. operating potential on the screen grid 30 of the driver amplifier 11 so long as the direct high voltage introduced between ground and terminal 59 exceeds the amplitude of the negative swing of the amplified audio signal by the normal operating or sustaining voltage of the selected VR tube. However, when the voltage across VR tube 35 is reduced below its extinguishing point due to the audio signal subtractively approaching the direct high voltage, the effective superimposed voltage appearing across the resistor 83 is applied directly to the screen grid 30 of the driver amplifier 11 to decrease the voltage applied thereto relative to normal operating potential and thus reduce the drive applied to the audio power amplifier. The feedback voltage is a changing portion of the direct high voltage as determined by the audio swing, choke 33 serving to block transients from the screen grid 30. In this manner the audio amplitude is automatically limited.

The foregoing action is accomplished without direct reference to the carrier or wave to be modulated which is developed by the oscillator comprising the tube 101 having a crystal 103 connected between its control electrode 105 and anode 107. High voltage is applied to the oscillator tube via terminal 109 and R. F. choke 111. The output of the oscillator tube 101 is coupled via condenser 113 to the control electrode 115 of the modulator or final modulated amplifier tube 75. The output of the final modulated amplifier tube 75 appears across an LC or tank circuit comprising the inductor 121 and condenser 123 shunted by a variable trimming condenser 125. An antenna post or load 127 is tapped into the inductor 121 through the tap 131.

Figure 2:
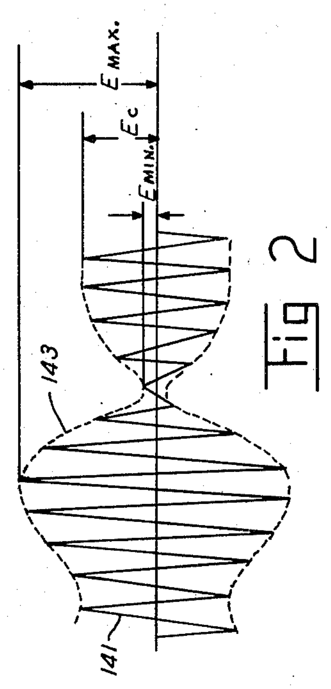
Fig. 2 is a wave-shape diagram useable to illustrate modulation principles applicable to the present invention.

Further description of the circuit of Fig. 1 may be facilitated if reference is had to Fig. 2 wherein there is depicted a carrier wave 141 modulated by an audio signal 143. The maximum amplitude of the modulated carrier is indicated by "$E_{max}$," the unmodulated amplitude of the carrier by "$E_c$," and the minimum amplitude of the modulated carrier by "$E_{min}$." The invention is unconcerned with the maximum amplitude achieved by the modulated carrier because splattering is only introduced if $E_{min}$ is reduced to zero. The degree of modulation "$m$" for the positive swing (upward modulation) of the audio signal 143 is represented by:

$$\frac{E_{max}-E_c}{E_c}$$

and the degree of modulation for the negative swing (down modulation) of the audio signal 143 is expressed as follows:

$$\frac{E_c-E_{min}}{E_c}$$

The voltage $E_{min}$ is representative of the D. C. potential normally appearing across the VR tube 35. The carrier wave 141 is not canceled below this level by subtractive modulation because once the VR tube is extinguished, negative feedback is applied to the driver tube 11 to reduce the amplitude swing of the audio signal 143 preventing further reduction of the carrier amplitude.

In view of the foregoing, the operation of the circuit of Fig. 1 may further be described if illustrative values are injected which values, of course, are in no sense limiting, but rather for the purpose of the example to follow. If the direct high voltage applied between ground and the terminal 59 has a value of 600 volts then conveniently the VR tube 35 may be of the 105 type capable of normally maintaining the screen grid 30 of the driver amplifier tube 11 at 105 volts above ground. The amplified audio voltage from the push-pull stage is superimposed upon the 600 volt D. C. applied at terminal 59 to comprise the high voltage modulated effective between the point 81 and ground. Thus it may be seen that when the audio signal passes through zero, approximately 105 volts of the 600 volt D. C. supply appear across VR tube 35 with the remainder being dropped across resistor 83 which may have a magnitude of 10,000 ohms. Since there is very little D. C. drop across the secondary winding 63 of the output transformer 57 and the R. F. choke 79, the effective D. C. applied to the plate circuit of modulator tube 75 is substantially 600 volts (when the audio signal passes through zero). However, if the audio signal swings positive, the effective voltage between point 81 and ground increases with the dropping resistor 83 absorbing the increased voltage relative to the constant 105 volts appearing across the VR tube 35. Hence, for any positive swing of the audio signal the screen grid 30 of driver tube 11 is maintained at a substantially constant potential of 105 volts and the circuit functions in conventional manner. The VR tube is characterized by its non-linear impedance or ability to maintain a substantially constant voltage drop regardless of the current variation until its supply voltage is decreased below the extinguishing point whereupon it opens the circuit in which it is connected. Any device exhibiting similar characteristics may be used to replace the VR tube. However, for reasons of economy the inexpensive VR tube is generally preferred.

Figure 3:
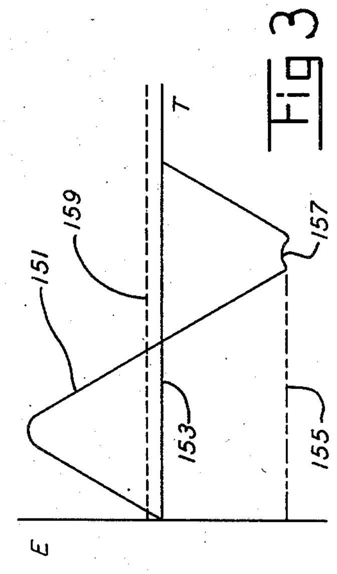
Fig. 3 is a curve depicting a modulating wave operated upon by a circuit in accordance with the instant invention.

As was previously mentioned, the present invention is not concerned with overmodulation which can only occur on the positive swing of the audio signal. However, overmodulation is prevented by the circuit of Fig. 1 as will now be explained. Whenever the negative swing of the audio signal approaches the assumed 600 volt value of the high voltage source sufficiently closely to reduce the voltage across VR tube 35 below its sustaining value, the potential applied to screen grid 30 of driver tube 11 is reduced below its normal operating value in accordance with the negatively swinging audio. This effect is represented in Fig. 3 wherein a single cycle of audio or signal voltage 151 shown in the form of a slightly asymmetrical constant tone or sine wave initially symmetrical with respect to the zero axis 153 is obtained across the primary winding 23 of output transformer 25 for the driver amplifier 11. The upward swing of the wave 151 represents the positive swing of the audio or signal unaffected in wave shape. However, the amplitude of the negative swing of the audio or signal is limited at the line 155 indicative of 495 volts or the value of the high voltage supply introduced at terminal 59 minus the value of sustaining voltage of VR tube 35. As will be recalled, this is the assumed value of audio voltage at which VR tube 35 extinguishes and the sensing circuit through dropping resistor 83 begins to apply negative feedback to the screen grid 30 of driver tube 11. As the screen grid voltage is lowered the drive supplied via the secondary winding 37 to the push-pull amplifier is reduced. The limitation of the negative swing of the audio or signal wave 151 effects a slight concavity represented at 157 in the wave shape of the audio due to the degenerative control. The axis of the wave 151 is shifted from the zero axis 153 to the dotted line 159 by the secondary winding 37 of the output transformer 25, thus substantially eliminating the asymmetrical appearance of the wave 151 with respect to the zero axis 153. Throughout the remainder of the circuit there is a tendency toward the reshaping of the wave 151 to eliminate the concavity 157 and provide, for all practical purposes, an undistorted output from the transmitter of Fig. 1 while having effected a sufficient limitation of the degree of negative swing of the audio as to preclude any splattering. The axis shift from the zero axis 153 to the line mark 159 accounts for the fact that overmodulation as relates to the positive swing of the audio is also precluded by the circuit of the present invention.

The modulator tube 75 is never cut off because its plate circuit is maintained positive with respect to ground even after the VR tube 35 is extinguished because of the automatic reduction of audio drive as the tube 35 is turned off. The choke coil 33 shown included in the lead 31 extending from the VR tube 35 to the screen grid 30 of the driver amplifier tube 11 is used as an attenuating device for any high frequency transient oscillations established by the VR tube as it is extinguished. However, as the choke coil 33 does affect the gain of driver amplifier tube 11 adversely, sometimes it can be eliminated without noticeable effect upon the transmission, and, in fact, its elimination serves to improve the wave shape of the negative swing of the audio or signal as represented in Fig. 3. Other times, due to transformer phase shift in the inaudible range, i. e., frequencies of generally 30–50 kc. established by the VR tube in extinguishing, the feedback becomes regenerative and therefore the choke 33 becomes essential as offering high impedance to such transient frequencies. Hence, the choke is included in the circuit diagram. If desired, and as is already known in the art, screen grid feedback occasioning base boosting may be compensated for by the use of a small coupling condenser inserted in the control grid circuit to boost the highs.

Although the negative feedback as developed by the circuit above described is in reality the application of a voltage decreasing below the normal operating potential for an electrode of an amplifier stage, it should be pointed out that the reversal of either the input winding 55 or the output winding 63 of the transformer 57 will cause regeneration which may even break into oscillations and hence the reason for the nomenclature adopted. Considering the effective load on the transformer 57, it will be noted that the high resistor 83 is always present and therefore any change in the load of the modulator tube 75 does not affect the impedance as seen by the transformer as much as in a conventional circuit. Accordingly, any antenna loading changes imposed across the modulator do not have the usual adverse effects. In fact, when the negative feedback circuit of the present invention is incorporated in the transmitter, it has been found that the load on the modulator tube 75 can easily be reduced by 50% without introducing overmodulation or splattering. A further feature of the invention resides in the fact that since 100% modulation is precluded the plate circuit voltage on the modulator tube 75 cannot be driven below the effective voltage of the control electrode 115 to introduce distortion. Also, the power required to control the screen grid 30 is less than that which would be required for plate control of the driver amplifier 11, thereby permitting the use of the high valued dropping resistor 83 without unnecessary utilization of audio power for control purposes while effecting control in the low power level stage.

Figures 4, 5, 6, 7:
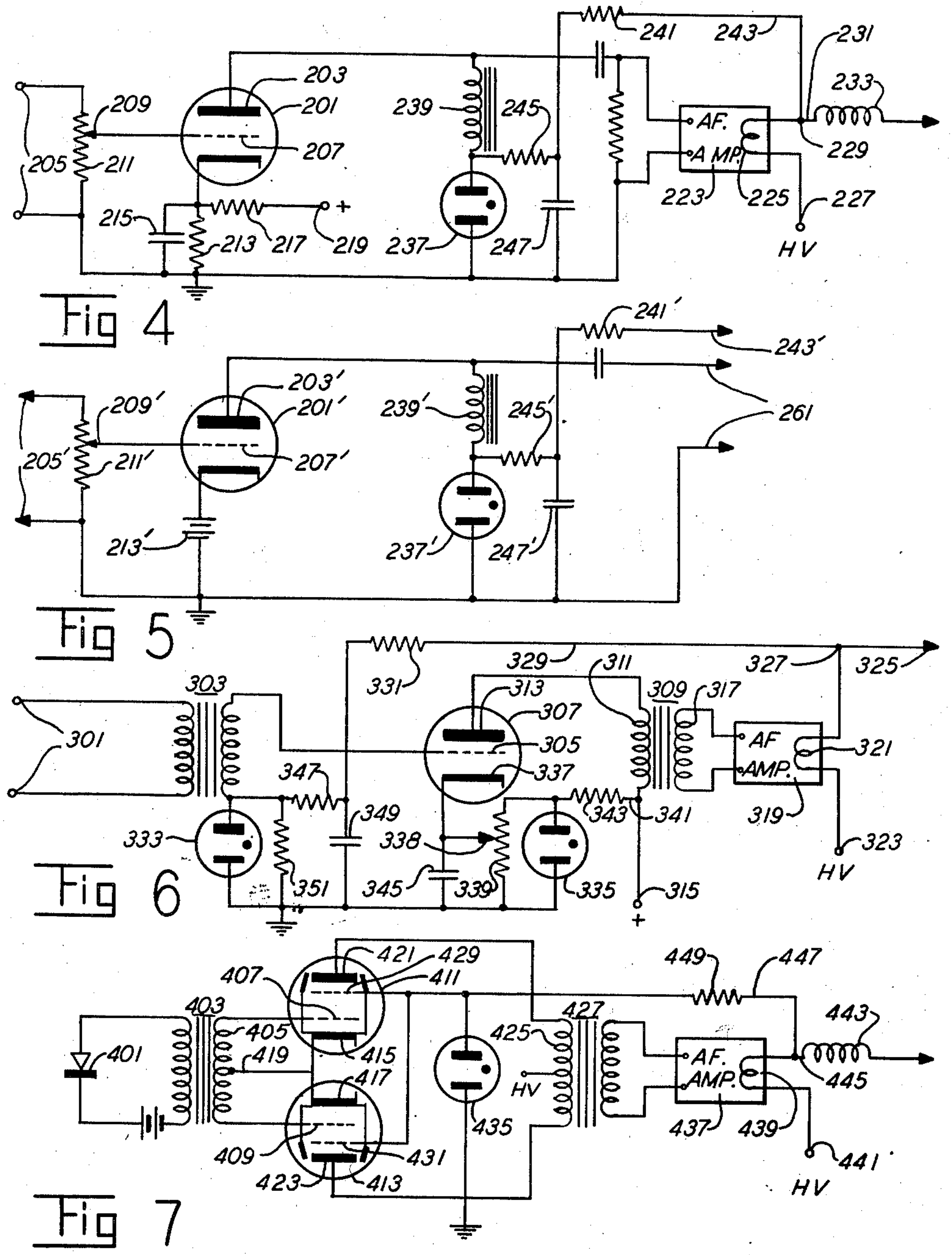
Fig. 4 represents a modification of the invention illustrated in Fig. 1 and incorporable in the transmitter thereof.
Fig. 5 shows the portion of the circuit of Fig. 4 for use as an adapter circuit for incorporation in existing transmitters.
Fig. 6 is a circuit diagram representing a further modification of the invention shown in Figs. 1 and 4.
Fig. 7 shows a push-pull amplifier circuit adapted for modulation control in accordance with the principles of the invention.

In order to illustrate the versatility of the control circuit of the present invention, Fig. 4 is included to show the driver amplifier comprising a triode 201 controlled through its plate electrode 203 in accordance with the principles aforementioned. The audio input is introduced at terminals 205 and applied to the control electrode 207 via the lead 209 tapped into a gain control potentiometer 211. Fixed bias is maintained on the tube 201 through the cathode resistor 213 by-passed to ground by the condenser 215. A high valued bleeder resistor 217 is connected between the cathode resistor 213 and a positive D. C. source of potential supplied at terminal 219 to insure current flow through the cathode resistor 213 at all times. The amplifier circuit including the tube 201 is RC coupled to an audio frequency power amplifier represented by the block 223. The block showing is used to illustrate the fact that the power amplifier need not be of the push-pull type but may comprise any suitable audio power amplifier of conventional design. The output of the power amplifier 223 appears across the winding 225 and is superimposed upon the direct high voltage introduced at terminal 227.

The high voltage modulated appears at point 229 corresponding to the voltage appearing at point 81 in the circuit of Fig. 1. The high voltage modulated is applied to the modulator stage (not shown) via lead 231 including RF choke 233. A VR tube 237 is connected in series with an audio choke 239 between ground and the anode 203 of the amplifier tube 201. A high value dropping resistor 241 is connected in series with the VR tube 237, the combination being supplied with high voltage modulated via lead 243 extending to the point 229. Hence, the potential effective across resistor 241 and VR tube 237 is comprised of the audio signal superimposed upon the direct high voltage. A small resistor 245 and a small condenser 247 comprise a damping circuit for the high frequency oscillations developed by the VR tube as it is extinguished. It should be emphasized that the value of the condenser 247 is sufficiently small so as not to respond to the highest audio frequency present, generally of the order of 3,000 cycles.

The operation of the circuit depicted in Fig. 4 is identical with that of the circuit of Fig. 1 except that the anode voltage of the triode 201 is controlled in lieu of the screen grid of the pentode represented in the circuit of Fig. 1. Accordingly, the audio drive supplied to the power amplifier 223 is reduced whenever the amplified audio signal (at point 229) subtractively approaches the value of the direct high voltage introduced at terminal 227 sufficiently close as to cause VR tube 237 to be extinguished. Otherwise the normal operating potential applied to the anode 203 of amplifier tube 201 is substantially constant, being determined by the sustaining voltage of VR tube 237.

The circuit of Fig. 5 represents an adapter circuit patterned after the circuit of Fig. 4. The circuit of Fig. 5 may comprise a unit adapted for insertion between the microphone and the audio power amplifier stage of an existing transmitter which it is desired to modify for operation in accordance with that achieved by the circuits previously described herein. Where appropriate the prime of the numbers used in the explanation of the circuit of Fig. 4 will be applied in the following description relating to the adapter circuit. Input terminals 205′ are provided for attachment to the microphone or audio bandpass filter of the transmitter to be modified, the audio signal being applied via lead 209′ to the control electrode 207′ of an amplifier tube 201′. The grid circuit includes a gain control potentiometer 211′ and a fixed biasing arrangement for the tube 201′ shown as the battery 213′ connected in the cathode circuit. Normal operating potential is maintained on the plate 203′ of the tube 201′ by a VR tube 237′ in the manner of the aforementioned circuits. An audio choke 239′ is connected between the VR tube and plate electrode 203′ to insure the application of only direct potential to the plate 203′. A lead 243′ including a high value dropping resistor 241′ extends from the ungrounded side of the VR tube 237′ for connection to a point in the transmitter circuit where the amplified audio signal appears superimposed upon the modulator high voltage supply source. The output of the circuit of Fig. 5 appears across the terminals 261 which terminals are adapted for connection to the audio power amplifier of the transmitter to be modified.

A small resistor 245′ and a small condenser 247′ are connected to the VR tube 237′ to act as a damping circuit for any transient oscillations developed by the tube as it is extinguished. As in the case of the damping device included in the circuit of Fig. 1, the RC combinations shown in the circuits of Figs. 4 and 5 may be eliminated without noticeable effect upon the transmitter output or operation thereof unless regeneration as caused by transformer phase shift occurs, in which event the damping circuit is essential to proper operation. However, if the condenser 247′ is used its value must be selected sufficiently small as to offer high impedance to the audio signal to avoid interfering with the operation of the modulation control. Negative feedback, evidenced by a decreasing D. C. component, is applied over the lead 243′ when VR tube 237′ is extinguished as a result of the negative amplitude of the audio approaching the value of the high D. C. applied to the modulator. The reduced D. C. applied to the anode 203′ of amplifier tube 201′ causes operation below normal level. Hence the audio drive supplied to output terminals 261 is decreased thus insuring the presence of some carrier for transmission at all times.

The circuit of Fig. 6 operates according to the above-outlined principles to effect modulation control via the control electrode of an amplifier stage. This type control may of course replace that outlined in connection with Fig. 1, being incorporable in the transmitter thereof, or may comprise an adapter circuit in accordance with the showing of Fig. 5. For the sake of simplicity, a triode is illustrated as the amplifying device whereas of course a tetrode, pentode or other amplifying component will serve equally as well insofar as concerns the modulation control. The audio signal is applied at terminals 301 and passed by the transformer 303 to the control electrode 305 of the triode 307. An output transformer 309 has a primary winding 311 connected between the anode 313 of the triode 307 and a source of positive potential applied between the terminal 315 and ground. The secondary winding 317 of the transformer 309 is connected to an audio power amplifier represented by the block 319, the output of which appears across an output winding 321 connected between the high voltage terminal 323 and the lead 325 adapted to extend to the modulator stage (not shown) in the manner of lead 77 shown in Fig. 1.

The high voltage modulated appears at point 327 in the circuit and is applied to the grid circuit of the tube 307 by the lead 329 including the dropping resistor 331 connected to a VR tube 333 provided to determine normally the D. C. potential applied to the grid 305 relative to ground. A second VR tube 335 is connected between the cathode 337 of the tube 307 and ground. The VR tube 335 maintains a fixed bias of, for example, 105 volts in which event the VR tube 333 may have a sustaining voltage of 90 volts to permit the application of an effective 15 volt negative bias to the control electrode 305 so long as the VR tube 333 is conducting. This effective bias may be adjusted by movement of the cathode tap 338 on the potentiometer 339 connected in parallel with the VR tube 335. This latter tube is maintained in its conducting condition at all times through the lead 341 connected to the positive terminal 315. A suitable dropping resistor 343 is included in the lead 341 to insure the application of proper sustaining potential across the VR tube 335. An audio by-pass condenser 345 is connected between the cathode 337 and ground to prevent the signal from ever extinguishing the VR tube 335.

A damping circuit comprising the resistor 347 and small condenser 349 is connected across the VR tube 333 to relieve any effects of transient oscillations developed when this tube is extinguished by the effective value of the high voltage modulated decreasing below the sustaining voltage of the VR tube. Also, a high resistor 351 is connected in parallel with the VR tube 333 to complete the D. C. path for the high voltage modulated.

For normal operation, the audio signal applied at terminals 301 is passed by the tube 307 and amplified by the amplifier of conventional design represented by the block 319 and then applied via lead 325 to the modulator (not shown) for combination with the carrier. However, when the audio signal tends to increase in amplitude sufficiently high as to cause carrier cutoff the effective value of the high voltage modulated at point 327 decreases below the sustaining voltage of the VR tube 333 on the negative swing of the modulating or signal wave to extinguish this tube and apply negative feedback to the control grid 305 of the amplifier tube 307. The reduction of the normal operating potential effective on the control grid 305 decreases the drive to amplifier 319 in accordance with the principles hereinbefore outlined. Although the amplifier tube 307 is generally operative the presence of a high degree of feedback causes the tube to approach cutoff.

The circuit of Fig. 7 represents a modification of the invention which operates as a modulation control by passing or preventing the passage of the audio signal. The circuit also represents an application of a modulation control as effected in the power amplifier of a transmitter, herein shown as a push-pull stage. A microphone 401 is shown supplying an input transformer 403 having a secondary winding 405 connected between the control electrodes 407 and 409 respectively of a pair of beam power tubes 411 and 413. The cathodes 415 and 417 are center tapped into the transformer winding 405 via lead 419 and the anodes 421 and 423 are connected to the primary winding 425 of an output transformer 427. The screen grids 429 and 431 are tied together and connected to a VR tube 435 which establishes normal operating potential. The amplified audio signal is supplied to a further audio amplifier represented by the block 437, which may comprise the final amplifier, by way of the transformer 427. The output of the amplifier 437 appears across an output winding 439, one end of which is supplied with high direct voltage at the terminal 441 and the other end of which is connected through R. F. choke 443 and adapted for connection to the modulator (not shown). The high voltage modulated appears at point 445 of the circuit and is applied via lead 447 and dropping resistor 449 to the junction between the VR tube 435 and the screen grids 429 and 431. In this manner the screen grid D. C. potential is reduced from its normal value in accordance with the negative swing of the signal whenever the effective value of the high voltage modulated decreases below the sustaining voltage for the VR tube 435. Reduction of the screen grid potential in the push-pull stage serves to cut off the push-pull amplifier and momentarily eliminate the audio signal being supplied to the modulator. One advantage of this circuit over that of Fig. 1 is the fact that the connections for the transformer supplying the modulator stage cannot be made incorrectly to cause the circuit to function regeneratively. However, the circuit of Fig. 7 offers no degenerative wave shaping as explained in connection with Fig. 3, resulting in some distortion.

The invention as illustrated throughout the drawings shows the application of modulation control over various electrodes of amplifier devices. In each instance the control is fully automatic, the operating potential of the controlled electrode being reduced from normal (or the tube cutoff) and reestablished in accordance with the effective potential difference between the signal and the direct high voltage.

The means for establishing the maximum negative swing of the modulated output is illustrated as a voltage regulator tube because this is the most economical and simplest device for the purpose. The same effects can be accomplished by a biased rectifier or by various other more complicated circuits, but the simplicity of the voltage regulator renders it the preferred form of this invention.

What is claimed is:

1. In a transmitter having a modulator stage supplied with a carrier wave and an amplifier for supplying an audio wave thereto which is superimposed upon the D. C. operating supply voltage for the stage, a circuit for limiting the degree of modulation to less than 100% comprising means responsive to a portion of the D. C. supply voltage for establishing normal operation of the amplifier, and means responsive to the effective value of the superimposed audio wave to reduce the amplifier operation below normal when the audio wave subtractively exceeds the D. C. supply voltage minus said portion.

2. The circuit of claim 1 wherein the means responsive to a portion of the D. C. operating supply voltage comprises a gaseous discharge tube having a sustaining voltage substantially equal to said portion of the D. C. voltage.

3. The circuit of claim 1 wherein the means responsive to a portion of the D. C. supply voltage and the means responsive to the effective value of the superimposed audio wave comprise respectively a gaseous discharge tube and a substantially linear impedance connected in electrical series relation.

4. The circuit of claim 1 wherein said first mentioned means comprises a gaseous discharge tube having a sustaining voltage substantially equal to said portion of the D. C. voltage and said second mentioned means comprises a feedback path from the modulator to the amplifier including a resistor connected in electrical series relation with the discharge tube for reducing the amplifier operation below normal in accordance with the negative swing of the audio wave when the audio wave subtractively exceeds the D. C. supply voltage minus said portion and the discharge tube is extinguished.

5. A modulating circuit for supplying controlled modulating anode potentials to a radio frequency tube to prevent negative overmodulation thereof, comprising a first amplifier tube adapted for connection to a source of modulating frequencies, a second amplifier tube coupled in cascade to said first tube, an output circuit for said second tube including in series an impedance element supplied with modulating-frequency potentials by said second tube and connections for a source of D. C. anode potential for the radio frequency tube to be modulated, a sensing circuit connected in parallel with said output circuit comprising a linear resistor and a non-linear resistor in series, said linear resistor being of relatively high value and connected to the positive side of said output circuit and said non-linear resistor being of relatively low value and characterized by increasing effective resistance when the voltage thereacross is reduced, and a feedback loop connected from the junction of said linear and non-linear resistors to said first amplifier tube to apply thereto negative feedback potentials of increasing relative magnitude as the resistance of said non-linear resistor increases.

6. A modulating circuit as defined in claim 5 wherein said non-linear resistor comprises a gaseous discharge tube.

7. A modulating circuit as defined in claim 5 wherein said first amplifier tube comprises at least one electrode requiring a positive operating bias and said feedback loop comprises a connection for supplying said operating bias to said tube.

8. An amplifier for supplying modulating potentials to a radio-frequency tube having an anode circuit carrying high-frequency oscillations, comprising an amplifier tube including at least one electrode operating at a positive biasing voltage and having an input circuit for receiving modulating signals and an output circuit for supplying amplified modulating signals to said radio-frequency tube, and means for supplying biasing and controlling potentials to said electrode of said amplifier tube comprising a sensing circuit adapted for connection across the anode circuit of said oscillator and including a linear resistor for connection to the positive side of said anode circuit in series with resistive means which is substantially non-conductive when subjected to voltages of less than a selected value for connection to the negative side of said anode circuit, and a connection from the junction of said resistor and resistive means to said electrode.

References Cited in the file of this patent

UNITED STATES PATENTS

| | | |
|---|---|---|
| 2,521,052 | Edwards | Sept. 5, 1950 |
| 2,534,073 | Sherwood et al. | Dec. 12, 1950 |